Dec. 4, 1923.  
A. W. WELLINGTON  
FURNITURE KNOB MOUNT  
Filed Dec. 22, 1922  
1,476,384

Inventor  
Arthur W. Wellington  
by Seymour Earle  
atty.

Patented Dec. 4, 1923.

1,476,384

UNITED STATES PATENT OFFICE.

ARTHUR W. WELLINGTON, OF WATERBURY, CONNECTICUT, ASSIGNOR TO CHASE COMPANIES INC., OF WATERBURY, CONNECTICUT.

FURNITURE-KNOB MOUNT.

Application filed December 22, 1922. Serial No. 608,445.

*To all whom it may concern:*

Be it known that I, ARTHUR W. WELLINGTON, a citizen of the United States, residing at Waterbury, in the county of Waterbury and State of Connecticut, have invented a new and useful Improvement in Furniture-Knob Mounts; and I do hereby declare the following, when taken in connection with the accompanying drawings, and the characters of reference marked thereon, to be a full, clear, and exact description of the same, and which said drawings constitute part of this application, and represent, in—

Figure 1:
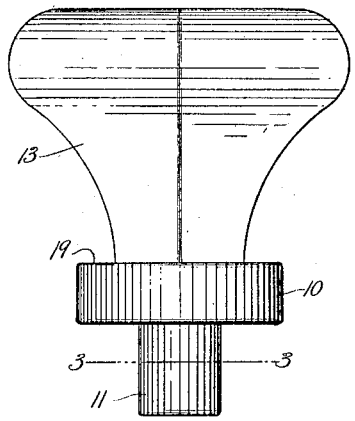

Fig. 1 a view in side elevation of a furniture-knob provided with a mount constructed in accordance with my invention.

Figure 2:
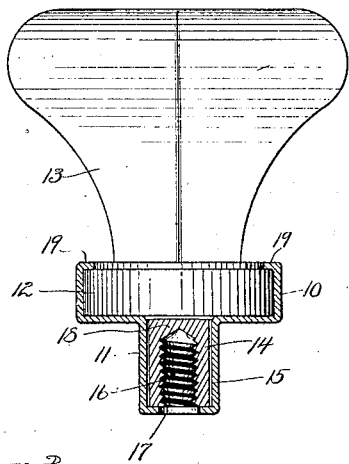

Fig. 2 a similar view thereof, with the mount in section.

Figure 3:
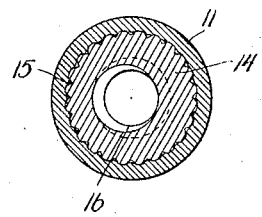

Fig. 3 a view in transverse section on the line 3—3 of Fig. 1, through the stem of the mount.

Figure 4:
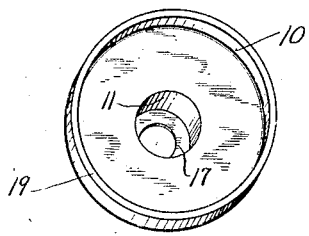

Fig. 4 a detached perspective view of the shell of the mount.

Figure 5:

Fig. 5 a similar view of the serrated plug thereof.

My invention relates to an improvement in furniture-knob mounts, more particularly to the mounts of knobs of glass, porcelain, composition, or other like material, the object being to produce, at a greatly reduced cost, a knob which is at once of superior attractiveness and constructed so as to reduce the danger of breakage when applied for use.

With these ends in view, my invention consists in a furniture-knob mount having certain details of construction and combinations of parts as will be hereinafter described and particularly pointed out in the claims.

In carrying out my invention, as herein shown, I produce a one-piece, sheet-metal shell having a cylindrical knob-socket 10 open at its outer end and a concentric plug-socket 11, smaller in diameter than the said knob-socket and closed at its inner end except for a concentric screw-hole 17 therein. The said knob-socket 10 is adapted in depth and diameter to receive an annular flange 12 of slightly smaller diameter and of slightly less depth, formed integral with and offsetting from the shank of the knob 13, which may be of glass, porcelain, vitrified composition, fibre, or even of wood. Within the plug socket 11 I locate a cylindrical metal plug 14, slightly shorter than it is in length, and formed with longitudinal serrations 15, which, when the plug is driven into the socket, bite into the inner wall thereof, whereby the plug is firmly held against rotation in the socket. The said plug is drilled and tapped from its inner end to form a threaded bore 16 for the reception of the fastening-screw (not shown) which passes into it through the concentric screw-hole 17 in the inner end of the plug socket 11. The bore 16 does not pass entirely through the plug, the outer end of which forms, as it were, an abutment 18 for preventing the fastening-screw from impinging against the inner face of the flange 12 of the knob 13 and so breaking the same, as frequently occurs in metal-mounted glass knobs.

It will be understood that after the flange 12 of the knob 13 has been inserted into the socket 10 of the shell, the edge 19 thereof is spun over the flange for securing the shell to the knob.

My improved mount, as thus constructed, is much cheaper than one-piece mounts, turned from rod-stock, and also presents a better appearance than the same, and avoids breakage, since the screw-holes in those turned metal knobs of the prior art were drilled from the front when the knob-socket was being turned, thus exposing the screw-hole from the front, and permitting a too-long fastening-screw to impinge upon the knob-flange, with the liability of breaking the knob.

I claim:

1. In a metal mount for furniture knobs, the combination with a one-piece, metal shell having an open knob-socket for the reception and retention of the flanged inner end of a furniture knob, and a concentric plug-socket opening out of the said knob-socket and closed at its inner end except for a central screw-hole; of a plug introduced into the plug-socket through the open end of the knob-socket, having a concentric threaded bore to receive a screw entering it through the said screw-hole, and having an abutment to prevent the fracture of the knob by the screw entering the said screw-hole and bore.

2. A metal mount for furniture knobs, comprising a one-piece metal shell having a knob-socket open at its outer end, and a plug-socket smaller in diameter than the said knob-socket and closed at its inner end, except for a central screw-hole; and a plug driven into the said plug-socket from the open end of the said knob-socket and formed with a threaded bore entering it from its inner end and having peripheral, longitudinal serrations by which it is held against rotation in the said plug-socket.

3. The combination with a knob provided at its inner end with an annular flange larger in diameter than the same, of a one-piece metal shell comprising a knob-socket open at its outer end for the reception of the said annular flange of the knob, and also comprising a plug-socket smaller in diameter than the said knob-socket and closed at its inner end except for a concentric screw-hole therein, and a plug located in the said knob-socket, held against rotation therein and formed with a threaded bore entering it from its inner end and concentric with the said screw-hole.

In testimony whereof, I have signed this specification in the presence of two subscribing witnesses.

ARTHUR W. WELLINGTON.

Witnesses:
A. C. RECKER,
J. S. NEAGLE.